Dec. 18, 1956  J. J. WIRTS  2,774,585
APPARATUS FOR PURIFYING LIQUID MATERIALS
Filed Aug. 17, 1953

INVENTOR.
JOHN J. WIRTS
BY Robert F. Fleming Jr.

ATTORNEY

United States Patent Office 2,774,585
Patented Dec. 18, 1956

2,774,585

APPARATUS FOR PURIFYING LIQUID MATERIALS

John J. Wirts, Cleveland, Ohio

Application August 17, 1953, Serial No. 374,637

The entire term of the patent to be granted has been dedicated irrevocably to the free use of the Public of the United States and the Territories thereof 2 Claims. (Cl. 261—122)

This invention relates to method of purifying liquid materials by gas diffusion.

One of the primary methods for purifying liquid aqueous waste materials is that of diffusing a gas into the aqueous material. In this method the gas is passed through a porous media which is in contact with the liquid. The main purpose of such purification is the removal of dissolved or suspended solids in the liquid. During this operation some of the solid material in the waste product gets into the pores of the diffuser. As a result, the pores of the diffuser will in time become clogged and the article is no longer of use. At this point it must either be discarded or cleaned. Either eventuality involves extra cost.

For example, the diffuser plates which are used in aeration of sewage will normally become unusable in a matter of from 3 to 4 years depending on the location of the disposal plant. In general, the clogging is due to grease and precipitated ferric oxide and/or silica which get into the pores of the diffuser plates. In order to clean the plates so that they are satisfactory for further use it is necessary to subject them to chromic oxide-sulphuric acid treatment under pressure. The cost of cleaning amounts to about $1.00 per plate.

The clogging of diffusers due to the deposition of solids therein occurs not only in sewage disposal but also in other purification processes such as the softening of water by the diffusion method, i. e., by diffusion of carbon dioxide through the water in order to precipitate the calcium as calcium carbonate. This material tends to precipitate in the pores of the diffuser thereby clogging it.

It will be highly desirable, therefore, to provide a mthod which would substantially retard or prevent the deposition of solid materials in the pores of gas diffusers during purification of aqueous materials.

Prior to this invention it was known from United States Patent 2,541,838 that porous filter media could be treated with siloxane fluids so that gas could pass through the filter but liquid would not pass through it. The use of liquid siloxanes is not suitable for this invention. The applicant has found, however, most unexpectedly, that the life of porous diffusers in contact with contaminated liquids is substantially increased by treating the mixture with organopolysiloxane resins.

It is the object of this invention to provide a more economical method for the treating of waste materials by gas diffusion.

Another object is to provide a superior gas diffusion media which gives a more uniform flow of gas therethrough.

Another object is to prevent the clogging of gas diffusion media which are in contact with a liquid, by solids which are derived from the liquid.

In accordance with this invention a liquid aqueous material is purified by passing a gas into the liquid through a diffuser in contact with the liquid, in which diffuser the walls of the pores are coated with a thin coating of an organopolysiloxane resin having an average of from 1 to 1.7 monovalent hydrocarbon radicals per silicon atom, at least a major portion of the silicon atoms in said siloxane being connecting by silicon-oxygen linkages and any remaining silicon atoms being connected by linkages of the group consisting of carbon-silicon and silicon-silicon linkages. The use of this method results in substantially retarding the deposition of solid material in the pores of the diffuser and in a more uniform flow of gas through the diffuser.

One specific embodiment illustrative of this invention is shown in the accompanying drawing.

Figure 1:
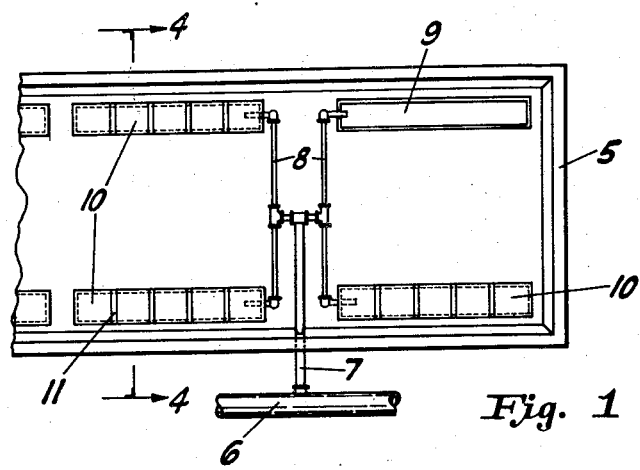
Fig. 1 shows a top view of an empty sewage aeration tank.
Figure 2:
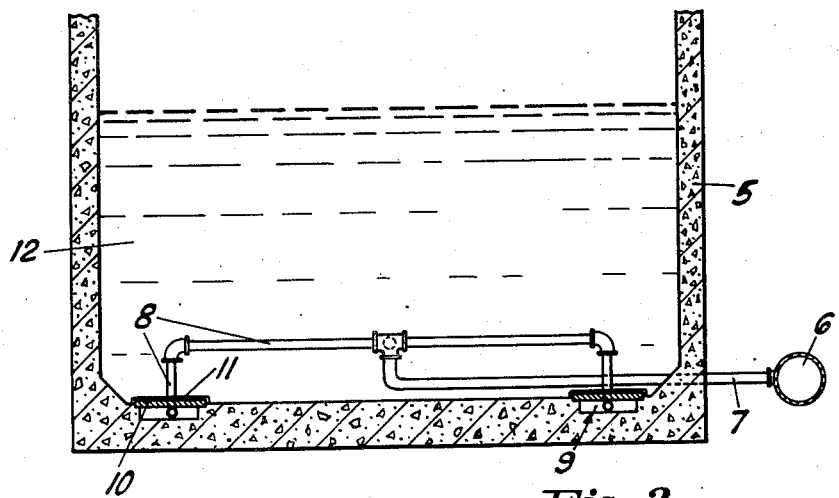
Fig. 2 is a sectional view of the tank along the lines 4—4 of Fig. 1.
Figure 3:
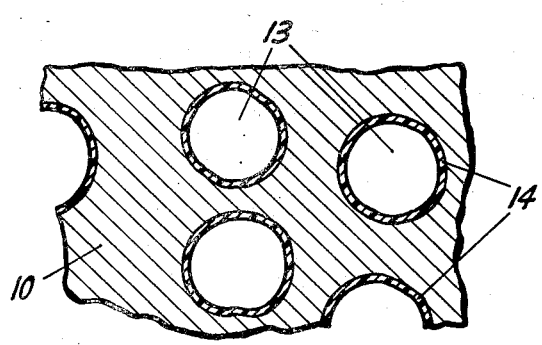
Fig. 3 is a sectional view of a portion of a diffuser giving an enlarged view of the pores coated with an organosiloxane resin.

In this embodiment of the invention air is passed from main 6 through conduits 7 and 8 into manifolds 9 and thence through the porous plates 10, which are held in place by metal holders 11, up through the liquid sewage 12. The pressure of the air is sufficient to balance the downward pressure of the liquid so that no liquid is forced through the diffuser. The deposition of solid material in the pores 13 of the diffuser is prevented or retarded by the coating of a siloxane resin 14 on the walls thereof.

It should be understood that this invention is not limited to the treatment of sewage but can also be employed in the treatment of any aqueous material from which it is desired to remove contaminants by gas diffusion methods.

The diffusers employed in this invention can be of any desired material. Preferably they should be of non-corrosive materials such as cinder blocks, aluminum oxide, cement, Carborundum, burned shale and the like, although porous metal diffusers may be employed if desired.

This invention is also applicable to diffusers of any desired shape. Thus in lieu of the plates shown in the drawing one can employ equally well hollow porous blocks or cylindrical tubes. When a hollow diffuser is employed the gas is forced into the hollow portion thereof and diffuses through the walls. In all cases it is best to use sufficient gas pressure to balance the downward or inward pressure of the liquid.

Any organopolysiloxane resin having any monovalent hydrocarbon radical substituted on the silicon can be employed in this invention. For the purposes of this invention it is necessary that there be from 1 to 1.7 monovalent hydrocarbon radicals per silicon atom. If the ratio of hydrocarbon radical to silicon is 2 or above, the polysiloxanes tend to be volatile and are not suitable for prolonged use in gas diffusers. This is due to the fact that the constant stream of gas through the pores tends to remove the siloxane by volatilization. Such difficulty is avoided, however, by employing the resinous siloxanes defined herein.

In addition to siloxane resins in which all of the silicon atoms are linked by silicon-oxygen linkages

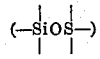

this invention includes within its scope resins in which some of the silicon atoms are bonded by silicon-carbon linkages

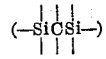

or by silicon-silicon linkages

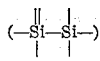

or both. In other words, this invention includes the use of polysiloxane resins and combinations of polysiloxane resins with polysilcarbane resins, i. e., resins of the unit formula

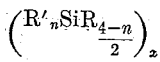

where R' is monovalent hydrocarbon, R is a divalent hydrocarbon radical such as methylene, ethylene and phenylene and $n$ has a value from 1 to 1.7 and polysilane resins of the unit formula $(R'_nSi-)$ where R' and $n$ are as above defined. In addition to the monovalent hydrocarbon radicals the resins of the invention may contain limited amounts of silicon bonded alkoxy radicals and silicon bonded H atoms. In any case at least a major portion of the silicon atoms are linked through silicon-oxygen linkages.

Resins of the type employed herein are well-known materials which are commercially available. For example, resins which contain mixtures of all three of the above type linkages are produced by the hydrolysis of the residue obtained from the reaction of methylchloride with silicon. After removal of the resulting monomeric methylchlorosilanes there is obtained a complex mixture of chlorinated methylsiloxanes, chlorinated methylsilcarbanes and chlorinated methylpolysilanes. Upon hydrolysis of this material, a resinous product containing all three linkages results.

The silicon atoms in the resins employed herein can have any monovalent hydrocarbon radical substituted thereon. Specific examples of such radicals are alkyl radicals such as methyl, ethyl, isopropyl and octadecyl; alkylene radicals such as vinyl, allyl and octadecenyl; cycloaliphatic radicals such as cyclohexyl and cyclopentyl; and aryl hydrocarbon radicals such as phenyl, tolyl, benzyl and xenyl.

The best method of impregnating the porous diffuser with the silicone resin is to apply the resin in the form of a dilute solution. Enough solution should be employed so that the diffuser is thoroughly soaked. The concentration of the solution should be sufficiently dilute so that there will be no substantial clogging of the pores of the diffuser. The specific concentration employed will vary depending up on the mode of application and the porosity of the diffuser. In general, however, solutions of from 2 to 10% by weight siloxane resin are suitable.

The solution may be applied by any suitable means such as by spraying, painting or dipping. After the solution has been applied the solvent is allowed to evaporate. The resin can be cured at room temperature although the cure is hastened by heating at temperatures up to 250° C. If desired, curing catalysts such as alkyl titanates, metal salts of carboxylic acids or alkali metal hydroxides may be used.

The following examples are illustrative only and should not be construed as limiting the invention which is properly set forth in the appened claims.

*Example 1*

A 5% solution of the organopolysiloxane resin described infra, in a petroleum hydrocarbon solvent was applied to porous aluminum oxide blocks in amount of one gallon of solution per 75 square feet of the blocks. The solution was applied by means of a roller. The blocks were allowed to dry for three days at room temperature and were then placed in a sewage aeration tank and operated as gas diffusers along with untreated porous aluminum oxide blocks in the manner shown in the drawing and described above. After 6 months of operation the treated blocks were much less contaminated with matter of sewage origin than the untreated blocks.

Both sets of blocks were examined after 1 year of operation and the superior condition of the organopolysiloxane treated blocks indicated that the useful life of these blocks as diffusers in the aeration process was from 25% to 50% longer than the useful life of the untreated blocks. This represents a substantial saving in the cost of the aeration of sewage.

The organopolysiloxane resin employed in this example was a partially hydrolyzed methoxylated siloxane resin having 27.1 percent by weight silicon bonded methoxy groups and 29.1 percent by weight silicon. There was an average of about 1.1 alkyl radical per silicon atom. The alkyl radicals were methyl, ethyl and propyl radicals.

This resin was prepared from a liquid material boiling above 70° C. at 760 mm. which was obtained from the reaction of methylchloride with silicon. The composition of the material was as follows:

4.4% methylchlorosilanes of the formula $Me_nSiCl_{4-n}$,
27% higher alkyl chlorosilanes of the formula $R_nSiCl_{4-n}$,
6.1% disiloxanes of the formula $Me_nSi_2OCl_{6-n}$,
4.4% hexachlorodisiloxane,
8.8% methylchlorodisilanes of the formula $Me_nSi_2Cl_{6-n}$,
29.9 silcarbanes of the formula $$Me_n(SiCH_2Si)Cl_{6-n}$$
$$Me_n(SiCH_2CH_2Si)Cl_{6-n}$$
$$Me_n(SiCH_2SiCH_2Si)Cl_{8-n}$$

4.1% higher polymeric siloxanes, silanes and silcarbanes.

In the above compounds $n$ has an average value from 1 to 3 and all percentages are percent by weight.

The liquid material was treated with enough methanol to replace all the chlorine with methoxy groups. About 10 percent of the theoretical amount of water needed to remove all the OMe groups was then added and the resulting methanol was removed by distillation.

The remaining methoxy groups on the resin hydrolyzed when it was cured in the pores of the diffuser to give a permanent resinous coating on the pore walls. In the resin most of the silicon atoms were linked by oxygen atoms but some were linked through carbon atoms and others directly to other silicon atoms.

*Example 2*

Equivalent results are obtained when a 5% toluene solution of a siloxane resin having the composition 33⅓ mol percent dimethylsiloxane, 33⅓ mol percent monomethylsiloxane and 33⅓ mol percent monophenylsiloxane, is employed in the method of Example 1.

In addition to use on gas diffusers, the resinous siloxanes of this invention can be employed for treating sand filter beds. This may be accomplished by treating the sand with a solution of a siloxane resin so that the particles thereof are coated with the resin. The resulting treated sand will be more easily washed free of solid material by the well-known backwashing method. As a consequence, the beds are more easily cleaned and there will be less need for replacing the bed with fresh sand.

That which is claimed is:

1. In an apparatus for removal of dissolved or suspended substances in liquid media having a tank or other container at or near the bottom of which is located a porous medium and having means for supplying a gas under pressure to said porous medium whereby said gas diffuses through said porous medium thence through the liquid medium, thereby separating said dissolved or suspended substances from said liquid medium, an improvement characterized in that the walls of the pores of said porous medium have been coated with a thin coating of an organosiloxane resin having an average of from 1 to 1.7 monovalent hydrocarbon radicals per silicon, at least a major portion of the silicon atoms being connected by Si—O—Si linkages, any remaining silicon atoms being connected by linkages selected from the group consisting of Si—C—Si and Si—Si.

2. In an apparatus for purification and aeration of liquid sewage having a tank, porous gas diffusers located substantially on the bottom of said tank in contact with said liquid sewage, means for supplying a gas under pressure to said diffusers in such manner that the gas diffuses through said diffusers thence upward through the liquid sewage whereby dissolved or suspended solids are coagulated and/or precipitated out of the liquid sewage and the sewage is aerated, an improvement characterized in that the walls of the pores of said gas diffusers are coated with a thin coating of an organopolysiloxane resin having an average of from 1 to 1.7 monovalent hydrocarbon radicals per Si atom, at least a major portion of said silicon atoms being connected by Si—O—Si linkages, any remaining Si atoms being connected by linkages selected from the group consisting of Si—C—Si and Si—Si linkages.

References Cited in the file of this patent

UNITED STATES PATENTS

| | | |
|---|---|---|
| 2,412,470 | Norton | Dec. 10, 1946 |
| 2,430,749 | Van Denburg | Nov. 11, 1947 |
| 2,541,838 | Shardlon | Feb. 13, 1951 |
| 2,574,168 | Brick | Nov. 6, 1951 |